United States Patent [19]

Cordner

[11] 4,241,508
[45] Dec. 30, 1980

[54] CLEARANCE INDICATOR - BLIND MEASUREMENT

[75] Inventor: Obrey Cordner, Bellevue, Wash.

[73] Assignee: The Boeing Company, Seattle, Wash.

[21] Appl. No.: 970,903

[22] Filed: Dec. 19, 1978

[51] Int. Cl.² .............................................. G01B 3/28
[52] U.S. Cl. .............................. 33/169 B; 33/180 R
[58] Field of Search .............................. 116/208, 230; 33/DIG. 18, 180 R, 169 B, 169 R

[56] References Cited

U.S. PATENT DOCUMENTS

| 340,883 | 4/1886 | Kells | 33/180 R |
|---|---|---|---|
| 2,363,165 | 11/1944 | Vierling | 33/169 B |
| 2,413,797 | 1/1947 | Stone | 33/169 R |
| 2,445,176 | 7/1948 | Hoffman | 33/169 B |
| 2,514,794 | 7/1950 | Prince | 33/DIG. 18 |
| 2,667,700 | 2/1954 | Pistoles | 33/DIG. 18 |
| 2,729,891 | 1/1956 | Winter | 33/169 R |

*Primary Examiner*—Gerald Goldberg
*Assistant Examiner*—Denis E. Corr
*Attorney, Agent, or Firm*—B. A. Donahue; Glenn Orlob

[57] ABSTRACT

This invention is a machine component, specifically a bolt, incorporating a means of indicating the clearance the component has with an associated operating part. The device is in the form of a hollow bolt, within which is a slidable, but frictionally restrained, pin which protrudes from the head of the bolt. The device finds particular usefulness in mechanisms which, in the position in which the clearance is critical, are unaccessible for direct measurement.

3 Claims, 2 Drawing Figures

CLEARANCE INDICATOR - BLIND MEASUREMENT

FIELD OF THE INVENTION

In many mechanisms it is intended and required that a predetermined clearance be maintained between, say, a movable part and a fixed element. A particular instance is a pivoted arm which is a portion of an airplane leading edge flap. In this instance, when the flap is retracted, the arm approaches, but is not intended to contact, a fixed abutment. In order to guard against overtravel in an abnormal situation, however, a stop or fixed abutment may be engaged, as by the head of a bolt on the arm. However, by the nature of the flap mechanism the (nearly) engaging parts are concealed and inaccessible, necessitating, prior to this invention, awkward and time-consuming techniques to determine whether the desired predetermined clearance exists under normal operating conditions.

A BRIEF DESCRIPTION OF THE DRAWINGS

FIG. 1 of the drawings is a somewhat diagrammatic section of the leading edge of an airplane wing incorporating a flap mechanism including the clearance mechanism of this invention.

FIG. 2 is a longitudinal section of the clearance indicating device.

DETAILED DESCRIPTION

Figure 1:
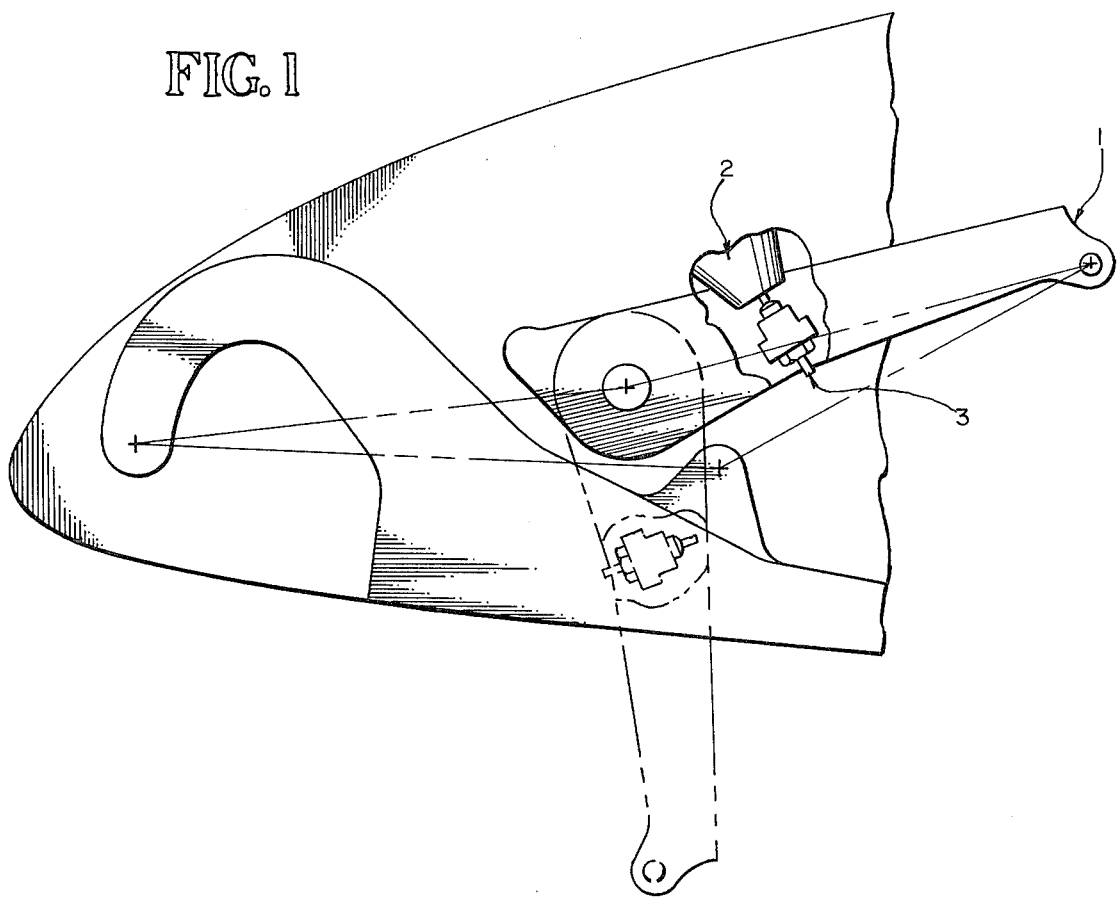

FIG. 1 of the drawings illustrates somewhat diagrammatically a portion of the leading edge of an airplane wing incorporating a leading edge flap which is extended or retracted depending upon flight conditions. The details of the flap mechanism are not important except to note that when the flap is retracted all the mechanisms involved lie within the wing contour and are invisible and inaccessible.

The elements of the flap mechanism pertinent here are pivoted arm 1 and fixed stop element 2 on the wing structure, the arm 1 being movable, by means not shown, between a retracted position adjacent the stop 2 and an extended position. A bolt 3 is attached to the movable arm 1. The head of bolt 3 is designed to contact the stop 2 under abnormal conditions, but normally is intended to clear the stop 2 by a predetermined amount, say 0.04 to 0.08 inches.

In order to determine whether in fact such clearance existed has been difficult because of the inaccessible location of the parts. Expedients such as applying a soft material such as putty to the bolt head, operating the flap through its cycle, and then measuring the thickness to which the putty is deformed, have been utilized. In my invention the conventional bolt is replaced by a special bolt-like element which at once acts as did the conventional bolt, and at the same time indicates the clearance with the stop element. Thus this device is neither a mere fastener, nor a measuring gage or instrument, but in effect, both, which becomes a permanent portion of the mechanism available not only during manufacture, but at any time in the service life of the mechanism.

Figure 2:
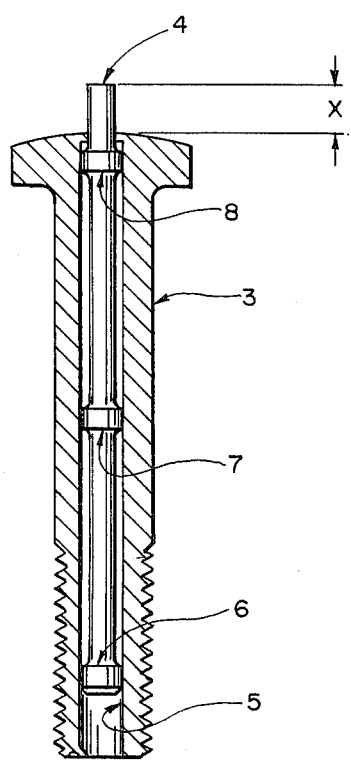

FIG. 2 shows my indicating bolt in detail. Externally the device resembles a conventional bolt, having a head (which preferably has an outer end formed to a spherical radius), and a shank terminating in a threaded portion. The bolt is hollow, having a longitudinal bore extending from end to end. This bore may be of reduced diameter adjacent the head of the bolt. Slidable within this bore is a pin 4, and end of which normally projects beyond the head, as shown. In my preferred form, the pin is provided with three lands, 6, 7, and 8, closely fitting the bore, which lands are separated by two grooves of slightly less diameter, and the projecting end is likewise of reduced diameter.

In operation, the projecting portion of the pin 4 strikes the stop element 2, pushing the pin longitudinally of the bolt, so that the projection of the pin beyond the head becomes a measure of the clearance, and is easily ascertained upon extension of the flap.

The pin must not slide freely within the bore of the bolt. To provide friction between the pin and the bore, before the parts are assembled the pin is bent slightly, so that the three lands 6, 7, and 8 are not quite coaxial. Upon assembly, the pin is forced to become essentially straight, so that the lands exert lateral force upon the bore wall, giving rise to friction resisting axial displacement. A typical value of frictional force is from 5 to 20 pounds. In addition, the space between the lands may be packed with a viscous grease.

If the protrusion of the pin from the bolt head is to be measured, the length of the pin is not critical. However, the pin may be of a length bearing a predetermined relation to the bolt length (the same, or shorter, or longer). Then, of course, the position of the pin may be determined by measurement from either end of the bolt. This may be advantageous in some applications.

In the application as shown, any clearance correction required is accomplished by placing appropriate shims under the bolt head. This eliminates any possibility of accidental change of adjustment in service. Of course, the bolt can be threaded into one of the elements and adjustment made by turning the bolt in or out as required.

What is claimed is:

1. An assembly of two relatively movable parts, the first of which includes an abutment portion and the second of which includes an abutting element comprising a bolt having a head which under normal operating conditions approaches but does not contact said abutment portion, but which may under abnormal conditions may strike said abutment portion, said bolt having an axial bore extending through said head, and a pin slidable within said bore and frictionally engaging the walls thereof, whereby the protrusion of said pin beyond said head is an indicator of the clearance between said bolt head and said abutment portion under normal operating conditions.

2. A clearance indicating bolt assembly comprising a hollow bolt having a head and a shank, a pin slidably mounted within said bolt and frictionally engaging its interior, and extending beyond said head in which said pin has three axially spaced lands slidably fitting within said hollow bolt, said lands being separated by grooves of lesser diameter, which lands are not coaxial in unassembled condition, whereby the lands frictionally engage the interior of the hollow bolt in the assembly.

3. A clearance indicating bolt assembly comprising a bolt having a head and a cylindrical shank, with an axial bore extending through the entire length of said bolt, and a pin within said bore and in frictional engagement with the walls thereof, extending beyond said head; wherein the length of the pin bears a predetermined relationship to that of the bolt whereby the clearance between said head and an adjacent part may be determined by measurement of the position of either end of the pin with respect to the adjacent end of said bolt.

* * * * *